Sept. 11, 1951   R. C. GOERTZ   2,567,202
EDDY CURRENT GENERATOR AND CONTROL CIRCUITS
Filed July 31, 1945   2 Sheets—Sheet 1
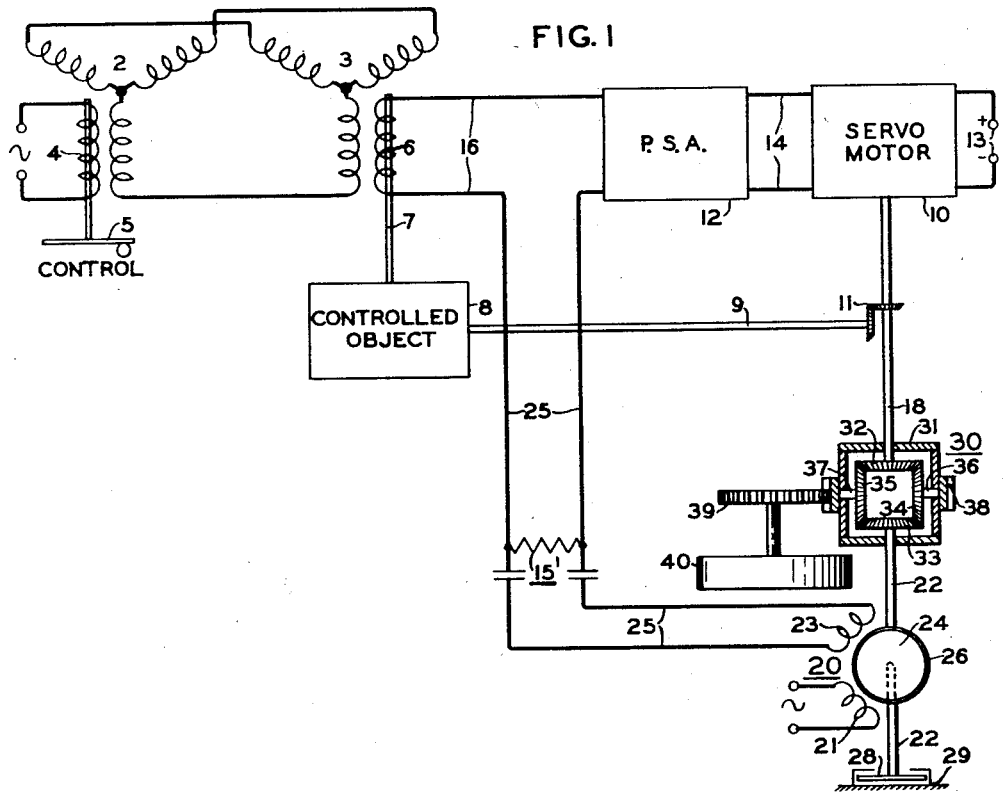
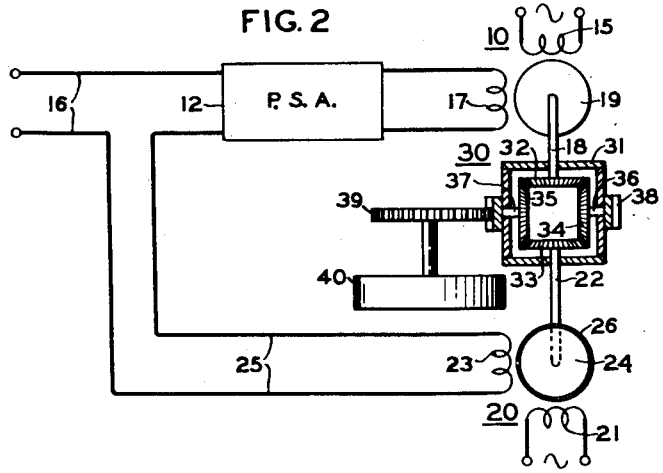
INVENTOR
RAYMOND C. GOERTZ
BY
*Herbert H. Thompson*
his ATTORNEY.

Sept. 11, 1951      R. C. GOERTZ      2,567,202
EDDY CURRENT GENERATOR AND CONTROL CIRCUITS
Filed July 31, 1945      2 Sheets—Sheet 2
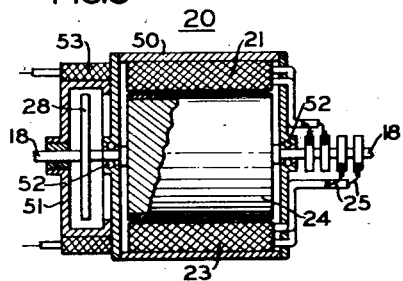
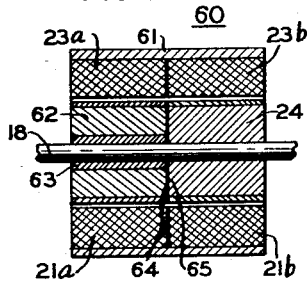
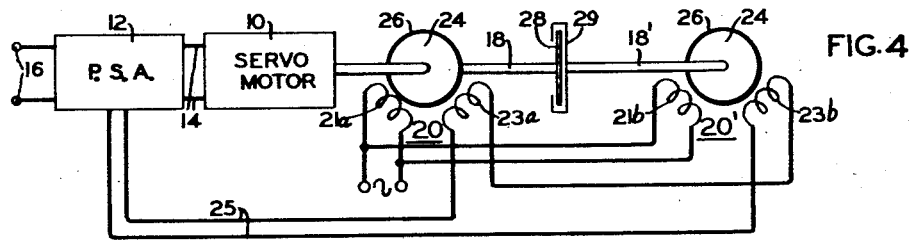
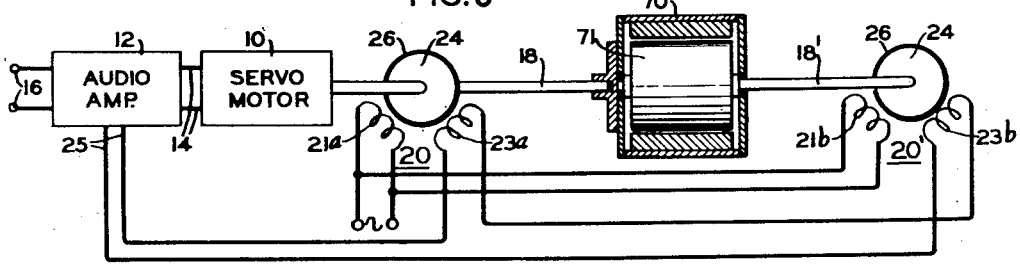
INVENTOR
RAYMOND C. GOERTZ
BY
his ATTORNEY.

Patented Sept. 11, 1951

2,567,202

UNITED STATES PATENT OFFICE 2,567,202

EDDY-CURRENT GENERATOR AND CONTROL CIRCUITS

Raymond C. Goertz, Hempstead, N. Y., assignor to The Sperry Corporation, a corporation of Delaware Application July 31, 1945, Serial No. 608,052

8 Claims. (Cl. 318—30)

This invention relates to improvements in servomotor controls, and, more particularly, to alternating voltage, speed signal-producing and wipe-out systems, and to novel A. C. eddy-current generators including mechanical means or impedances for obtaining "wipe-out" of the speed signal from an eddy-current generator or so-called "dynamic transformer."

In the development of servomotors for controlling guns, sighting systems and the like, the motors must operate to cause the sights and the like accurately to track or follow targets moving at considerable speed. To reduce the error at any steady speed in a servo system, it is desirable to cause the speed signal, which is employed for damping or stabilizing the servomotor, to decay or be "wiped-out" so as to be zero at steady speeds of the servomotor, and still leave the signal effective to resist changes of speed associated with hunting.

In Riggs Patent 2,115,086, there is disclosed the use of an A. C. eddy-current generator giving a signal at power-line frequency and having an amplitude proportional to the servomotor speed. The generator signal is fed back to the servo amplifier to stabilize the servo and prevent hunting.

When a servo system is to be stabilized, a voltage proportional to the speed of the servomotor or load and opposing the error voltage is utilized. Under such circumstances, servo systems were found to develop lag errors proportional to output speeds. To avoid or reduce these lag errors, wipe-out circuits were proposed whereby to provide a damping voltage only under transient conditions. In other words, the generated speed voltage substantially equals zero for constant speeds, otherwise what is termed a velocity error lag occurs and is present at constant speed.

When D. C. generators were used, resistance condenser networks were provided to give zero voltage for any constant speed of the servomotor. D. C. generators, however, have a number of disadvantages which are not characteristic of A. C. generators. This is particularly true of commutators and brushes, which have been found to give trouble. To utilize A. C. decay circuits to wipe out the A. C. speed voltage, the Q of circuits must be quite high in order to get a time constant of sufficient duration for usefulness. High-Q circuits are quite sensitive to power frequency shift. Furthermore, the fundamental frequency component is attenuated much more than the harmonic frequencies. If the input to the circuits is not a good sine wave, such fundamental frequency attenuation, without comparable attenuation of the harmonics, gives rise to trouble.

It has now been found that the error or speed signal from A. C. eddy-current generators can be wiped out at steady speed states of connected servomotors by coupling a friction drag means to the eddy-current generator, or embodying means in the generator providing a drag or load on the generator, the generator being connected to the servo through a differential, and the latter actuating an inertia device. With this combination, it is possible to utilize the advantages of the A. C. eddy-current generator or dynamic transformer for controlling servomotor speed, or stabilizing the error signal, while introducing the "wipe-out" technique for reducing the error or lag which otherwise increases with servomotor speed.

A feature of novelty and advantage of the present invention is to provide an A. C. eddy-current generator or system in which an A. C. speed voltage is generated under transient conditions but is wiped out at constant speed, under the latter conditions the voltage output from the system being zero.

Another feature of novelty and advantage of the invention herein resides in the use of mechanical impedance friction and the inertia of parts in an eddy-current generator drive system to insure wipe-out of generated A. C. voltage with constant speed of the controlled member.

Further features of novelty and advantage of the present invention reside in the provision of special eddy-current generator structures and circuits, including servomotor-driven differential drives with fly wheels and unitary or multiple shafts with viscous drag elements coupled therein.

The invention in another of its aspects relates to novel features of the instrumentalities described herein for achieving the principal objects of the invention and to novel principles employed in those instrumentalities, whether or not these features and principles are used for the said principal objects or in the said field.

A further object of the invention is to provide improved apparatus and instrumentalities embodying novel features and principles, adapted for use in other fields.

These and other desirable features of novelty and advantage of the present invention will be described in the accompanying specification and illustrated in the drawings, certain preferred elements being shown by way of example only, for, since the underlying features may be incorporated in other specific structures and circuits, it is not intended to be limited to the ones here shown, except as such limitations are clearly imposed by the appended claims.

In the drawing, like numerals refer to similar parts throughout the several views of which:

Fig. 1 is a schematic of a control circuit comprising a controlling and controlled object coupled through Selsyn or autosyn circuits, said controlled object being driven by a servomotor which is coupled through a differential and associated inertia device to a second control circuit including an eddy-current generator with friction drag;

Fig. 2 shows a modification of the system of Fig. 1 in which the eddy-current generator signal is combined with the servo error signal before the signal is fed into the phase-sensitive amplifier, the eddy-current generator having inherent friction drag;

Fig. 3 is a vertical section of an eddy-current generator having friction drag and in which the stator casing rotates under friction, on the rotor shaft, to serve as a fly wheel;

Fig. 4 is a schematic of a multiple eddy-current generator having its units viscously-coupled and its output electrical circuits in opposition;

Fig. 5 is a vertical section of a multiple-unit eddy-current generator having a plurality of rotors on a common shaft, at least one of the rotors being fixed to the shaft and the other having a slip fit so as to rotate thereon with friction and serving as the viscously coupled rotor of a second generator; and Fig. 6 is a view similar to Fig. 4, showing a magnetic coupling for the generator units.

The novel features of the invention herein should be considered with reference to the drawings and the specific showings therein. As shown in Fig. 1, a data transmission system comprising Selsyn or "autosyn"-type units is provided, the stators 2 and 3 of the transmitter and signal transformer, respectively, being connected in polycircuit fashion, as in delta or Y. The rotor 4 of the transmitter is energized by a suitable alternating voltage and is inductively coupled to stator 2, being driven, in the embodiment illustrated, by a suitable control member 5. The rotor 6 of the transformer is inductively coupled to stator 3 and is mounted on a shaft 7 driven from or with the controlled object 8 which may be a gun mounting, a searchlight or other device. The controlled object 8 is driven through shaft 9 from servomotor 10 by servo output shaft 18 and bevel gears 11. D. C. power input for the servomotor is indicated at 13. The servomotor is coupled or controlled by the out-of-phase error signal generated in rotor 6 when the controlled object 8 lies in angular disagreement with control member 5. The error signal is fed to the servomotor through a phase-sensitive amplifier 12 and leads 14, the amplifier normally being connected to the coil 6 through input leads 16. As here shown, one leg of the leads 16 is coupled with an eddy-current generator output circuit as will be described more in detail.

As intimated hereinabove, servomotor under accelerating or decelerating conditions may overrun, causing a reversal of the control signal and, unless damped, hunting of the systems even when they are coupled to the controlled object through the rotor coil 6 of the Selsyn or autosyn receiver. To remedy this condition, an eddy-current generator may be coupled to the servomotor to generate a speed or velocity signal which can be used to buck the error signal and effect the desired angular coincidence of the control member and the controlled object. The speed voltage may be applied degeneratively to control the servomotor through a suitable feed-back circuit.

The servomotor shaft 18 is connected to eddy-current generator 20 through a shaft 22 coupled through differential gearing 30. As shown herein, the eddy-current generator, also known as a dynamic transformer, is directly coupled to the servomotor; but the load shaft 9 could be directly coupled to the servomotor and the generator 20 coupled through any suitable gearing. The generator 20 has a rotor 24, of iron or other material, which is covered or provided with an external sheath 26 of nonmagnetic material such as copper. Cup-shaped rotors, as shown in Riggs' Patents 2,115,086 and 2,206,920, may also be used.

A viscous drag or damper is formed or provided on the end of shaft 22 as a disc 28, rotating, under viscous friction, in a casing 29, which is preferably fixed against rotation. As shown, the elements 28 and 29 are indicated as mutually spaced, but in practice they are intended to be in frictional engagement with the surfaces coupled through a body or film of oil of suitable viscosity. Viscous drag or friction may also be applied by using a suitable magnetic balance or electromagnetic drag device. In the servomotor art, the friction drag or coupling between a driving member and a driven or entrained member or device is also spoken of as "viscous drag" or "viscous coupling," and such usage comprehends the inclusion of electromagnetic or magnetic coupling and/or braking.

The generator 20 will have a pair of coils 21, 23, arranged in quadrature, with the coil 21 serving as an input for a fixed A. C. voltage, and the coil 23 serving to supply a voltage output which in amplitude is substantially proportional to the speed at which its rotor is driven. Its output is connected across resistor 15' thereby being combined through leads 25 with the error signal from transformer rotor winding 6 in the input to phase-sensitive amplifier 12. To provide the desired mechanical inertia and speed lag, the differential 30, as shown, may comprise a frame 31 in which shafts 18 and 22 are connected to bevel gears 32, 33, which gears are interconnected through planetary gears 34, 35. These gears are mounted for rotation on stub shafts 36, 37, in the frame 31. A ring gear 38 is mounted on the outside of the frame 31 transversely of the axis 18—22. The ring gear meshes with gear wheel 39 on which is mounted a fly wheel 40. The differential 30 in this embodiment forms an elastic-like coupling which is operable to produce a lag in its output speed relative to its input speed.

With this system, it will be seen that as the servomotor increases in speed or decreases in speed, there will be a differential rotation of shafts 18 and 22. As shaft 22 continues to rotate, the fly wheel 40 will be speeded-up through the coaction of the servomotor shaft 18 and the differential 30 until the speed of rotation of the fly wheel approximates that of the input shaft. The load or frictional drag on generator 20 is greater than the load of the inertia drive or fly wheel at constant speed so that, under constant speed conditions of the servo output, the output of generator 20 will decay to, or substantially to zero.

However, during the period of accelerating fly wheel 40 to uniform speed, the friction of viscous drag element 28 will impose a braking effect on the rotation of shaft 22. Therefore, with varying servo output speeds, the generator 20 will generate a voltage in output coil 23 which will decay thereafter to zero at constant speed. This velocity signal or output voltage from generator 20 is coupled into the phase-sensitive amplifier in a manner to buck the error or primary control signal whereby to prevent hunting of the servomotor. Because the velocity signal goes to zero under constant servo speeds, lag in the servo system is wiped out while the velocity signal is present during transient conditions to prevent hunting. Without the wipe-out of such velocity signal, the lag known as speed lag and occasioned by the velocity signal would increase with increased servomotor rates.

In the system shown in Fig. 2, frictional or viscous drag is inherent in the generator or between the elements thereof and means embodied therein, and the mechanical and electrical elements are otherwise substantially the same. In this figure, the servomotor 10 is shown schematically with its elements. These comprise a field coil 15 for the A. C. input and the coil 17 imposes a modified error signal from the phase-sensitive amplifier 12 on the motor. The rotor 19 of the motor is mounted on an input shaft 18 whose connections have been described hereinabove. While the differential 30 and fly wheel 40 have been shown in special forms, these are to be taken as illustrative only, as the differential may be incorporated in the fly wheel through a planetary gear system, or, as in Fig. 3, the differential may be dispensed with, and the rotor of the eddy-current generator frictionally or slip-fit mounted on the shaft 22 with appreciable friction therebetween.

In Fig. 3, the generator 20 is mounted on the servomotor shaft 18, with the viscous drag element 28 fixed on the shaft and enclosed in a fluid filled damper chamber 51 which is secured to and rotatable with casing 50. Thus there is provided a friction coupling between drag element 28 and casing 50 through the viscous fluid in damper chamber 51. The casing 50 is rotatable on the shaft, suitable bearings 52 being provided to permit impeded or controlled rotation of the stator frame. The drag element 28 may also be included in the field of a coil 53 mounted on the housing 51 and serving as an eddy-current motor or brake for the rotating system.

In Fig. 4 there is shown a modification of the system described above in which two eddy-current generators 20 and 20' are connected with their output coils in series opposition. In this arrangement, a pair of identical generators 20 and 20' are mounted on coaxial shafts 18, 18' and intercoupled through the viscous coupling elements 28, 29. The A. C. supply is fed to the two generators through the parallel connected coils 21a, 21b, while the output coils 23a, 23b are connected, in series opposition, to the output lines 25. It will be seen that the output voltage of this system will be proportional to the speed difference between shafts 18 and 18'. In this system, two A. C. voltages are bucked against each other to give a minimum or zero voltage output at any constant speed. Here the speed lag wipe-out will be provided electrically by the second generator 20' approximating the speed of generator 20 for any constant speed.

In the form shown in Fig. 5, the special multiple generator 60 is provided with a stator casing 61 in which are mounted coils 21a, 21b, 23a and 23b. One rotor core 24 is secured rigidly to shaft 18, while a second core 62 is mounted on a sleeve 63, for frictional engagement with shaft 18. The abutting faces 64, 65 of rotors 62 and 24 may be ground together and lapped, and the interfacial surfaces and the bearing surface of sheath 63 on shaft 18 may be slightly lubricated to give a friction drag or viscous coupling. With this arrangement, a viscous coupling or friction drag will be provided between the two rotors, although they are mounted on a common shaft. Usually and desirably, the coils 21a, 21b and 23a, 23b will be magnetically shielded or separated longitudinally a sufficient distance to prevent any undesirable magnetic coupling effects between the circuits.

The system of Fig. 6 is the same as that of Fig. 4, the friction drag or viscous coupling elements being magnetic and comprising a squirrel cage 70, and a cooperating magnet 71 of Alnico or other suitable magnetic alloy, to form a magnetic coupling connecting the shafts 18, 18'.

Since many changes could be made in the above constructions and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A system for generating a signal voltage during changing speed conditions of an associated object comprising a first generator and a driving shaft therefor, a second generator and a driving shaft therefor, driving means connected with said first generator and coupling means for connecting said driving means and said second generator, said coupling means affording asynchronous movements of said generators and said second generator exhibiting greater inertia than said first generator, and means for combining the outputs of said first and second generators in bucking relationship.

2. In an eddy-current generator system for generating a signal voltage during changing speed conditions of an associated object, in combination, a first generator and a driving shaft therefor, a second generator and a driving shaft therefor, and means providing a frictional coupling between the two said driving shafts, the second driving shaft having a sufficiently high inertia load as to lag behind said first driving shaft during but substantially only under transient speed conditions, and means for combining the outputs of said first and second generators in a bucking relationship.

3. In an eddy-current generator system for producing a signal voltage proportional to speed substantially only under accelerating or decelerating conditions, the combination of a first generator and a driving shaft therefor, a second generator and a driving shaft therefor, the generators being wound in quadrature with their output windings connected in series, voltage-opposing relation, and means providing a coupling between the said shafts, the second shaft having a sufficiently high inertia load as to lag behind said first shaft during but substantially only under transient speed conditions.

4. In a generator for producing a signal voltage proportional to speed substantially only under accelerations or decelerations of said generator comprising a first generator rotor and a second generator rotor, a pair of signal voltage-generating windings respectively associated with said rotors, said windings being connected to combine the voltages generated therein in bucking relation, and means for coupling said rotors together but allowing relative rotation therebetween, means for imparting rotation to a first of said rotors, and the other having a sufficiently high inertia load as to lag behind the first rotor under transient speed conditions.

5. In a system for generating a speed control voltage comprising a driving motor, a pair of generators driven by said motor for producing voltages proportional to the speeds thereof, the outputs of said generators being connected in voltage opposing relation, variable coupling means between one of said generators and said motor, the other of said generators being directly connected to said motor, said coupling means affording speed slip between said generators during accelerations or decelerations of said driving motor, whereby the effect of rotation of said two generators at equal speeds may be zero voltage output.

6. In a system of the character described comprising a signal generator means adapted to produce a primary control signal, a servomotor, control means for controlling said servomotor in accordance with said primary control signal, a first speed voltage generator means driven by said servomotor and adapted to develop a voltage proportional to the speed of rotation thereof, a feed-back circuit for supplying said speed voltage to said servomotor control means as a degenerative feed-back voltage to thereby damp said servomotor under decelerating conditions, a second speed voltage generator means electrically connected with said first speed voltage generator means and in voltage-bucking relation thereto, means for drivably connecting said servomotor with said first speed voltage generator means, and means including coupling means driven by said servomotor for driving said second speed voltage generator means, said coupling means being so constructed and arranged as to afford asynchronous speeds of rotation of said first speed voltage generator means and said second speed voltage generator means by effecting a slower response of said second speed voltage generator means to speed changes than said first speed voltage generator means.

7. In a system of the character described, a source of error signal voltage, a servomotor, amplifier means for controlling said servomotor in accordance with said error voltage, speed voltage generating means and a feed back circuit for supplying said speed voltage in degenerative fashion to said amplifier means, said speed voltage generating means comprising two generators each adapted to supply a voltage proportional to the speed of rotation thereof and said generators being connected together in voltage bucking relation, means for driving a first of said generators in accordance with servomotor speeds, and inertia-sensitive, variable speed coupling means drivably connecting the second of said generators with the output of said servomotor, said coupling means being inertia loaded so that said first generator will be driven at some speed relative to the second generator during changing speeds of said servomotor while under constant speed conditions of said servomotor the two generators will have substantially zero relative speeds to thereby provide substantially zero speed voltage output at constant servomotor speeds.

8. In a system for generating a speed control voltage comprising a driving motor, a pair of generators driven by said motor for producing voltages proportional to the speeds thereof, the output of said generators being connected in voltage opposing relation, magnetic coupling means connecting one of said generators and said motor, the other of said generators being directly connected to said motor, said magnetic coupling means affording speed slip between said generators during accelerations or decelerations of said driving motor, whereby the effect of rotation of said two generators at equal speeds may be zero voltage output

RAYMOND C. GOERTZ.

REFERENCES CITED

The following references are of record in the file of this patent:

UNITED STATES PATENTS

| Number | Name | Date |
|---|---|---|
| 467,547 | Mailloux | Jan. 26, 1892 |
| 653,424 | Lunt | July 10, 1900 |
| 2,056,348 | Edwards | Oct 6, 1936 |
| 2,115,086 | Riggs | Apr. 26, 1938 |
| 2,172,410 | Riggs | Sept. 12, 1939 |
| 2,259,311 | Kilgore et al. | Oct. 14, 1941 |
| 2,361,790 | Noxon | Oct. 31, 1944 |
| 2,403,605 | Lesnick | July 9, 1946 |
| 2,506,798 | Lilja | May 9, 1950 |